United States Patent
Clayton

(10) Patent No.: US 10,934,917 B2
(45) Date of Patent: Mar. 2, 2021

(54) METHOD FOR SELECTIVE CATALYTIC REDUCTION SYSTEM

(71) Applicant: Perkins Engines Company LTD, Peterborough (GB)

(72) Inventor: Robert Clayton, Peoria, IL (US)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 16/464,095

(22) PCT Filed: Dec. 11, 2017

(86) PCT No.: PCT/EP2017/082191
§ 371 (c)(1),
(2) Date: May 24, 2019

(87) PCT Pub. No.: WO2018/114424
PCT Pub. Date: Jun. 28, 2018

(65) Prior Publication Data
US 2019/0301332 A1    Oct. 3, 2019

(30) Foreign Application Priority Data
Dec. 21, 2016   (EP) .................................... 16205950

(51) Int. Cl.
*F01N 3/20*    (2006.01)
*F01N 9/00*    (2006.01)

(52) U.S. Cl.
CPC ........... *F01N 3/208* (2013.01); *F01N 3/2066* (2013.01); *F01N 9/005* (2013.01);
(Continued)

(58) Field of Classification Search
CPC ............. F01N 2240/40; F01N 2610/00; F01N 2610/02; F01N 2900/0406; F01N 3/2066;
(Continued)

(56) References Cited

U.S. PATENT DOCUMENTS 5,643,536 A * 7/1997 Schmelz ............ B01D 53/8696
                                                  422/105
8,080,209 B2 * 12/2011 Shirono ............. B01D 53/9431
                                                  422/177
(Continued)

FOREIGN PATENT DOCUMENTS

| EP | 2075050 A2 | 7/2009 |
|----|----|----|
| WO | WO 2009/135071 A2 | 11/2009 |
| WO | WO 2012/022687 A1 | 2/2012 |

OTHER PUBLICATIONS

International Search Report for Application No. PCT/EP2017/082191; dated Mar. 2, 2018.

*Primary Examiner* — Jesse S Bogue

(57) ABSTRACT

Selective catalytic reduction (SCR) systems are known and are generally included in the exhaust systems of diesel engines in order to treat the exhaust gases of such engines. Such systems typically involve the introduction of a diesel exhaust fluid (DEF) into exhaust gas flowing in an exhaust passage of an engine. DEF dosing systems are limited by the amounts of DEF that can be delivered without deposits forming on surfaces of the aftertreatment system. A numerical model of a hydrolysis catalyst is provided. The model comprises a spatial model of a hydrolysis catalyst to be modelled, where the hydrolysis catalyst is divided into a plurality of discrete spatial units. For each of the discrete spatial units, values for a plurality of matter state parameters are determined.

10 Claims, 2 Drawing Sheets

(52) U.S. Cl.
CPC ...... *F01N 2240/40* (2013.01); *F01N 2610/00* (2013.01); *F01N 2610/02* (2013.01); *F01N 2900/0406* (2013.01); *Y02T 10/12* (2013.01); *Y02T 10/40* (2013.01)

(58) Field of Classification Search
CPC .......... F01N 3/208; F01N 9/005; Y02T 10/24; Y02T 10/47
See application file for complete search history.

(56) References Cited

U.S. PATENT DOCUMENTS

| | | | | |
|---|---|---|---|---|
| 8,341,942 | B2* | 1/2013 | Bruck | B01D 53/90 60/286 |
| 9,315,391 | B2* | 4/2016 | Gerhart | F01N 3/2066 |
| 2008/0041052 | A1* | 2/2008 | Doring | F01N 13/009 60/612 |
| 2009/0151339 | A1* | 6/2009 | Doring | B01D 53/9431 60/295 |
| 2009/0205325 | A1* | 8/2009 | Kistner | F01N 3/28 60/297 |
| 2010/0050614 | A1* | 3/2010 | Parmentier | F01N 3/208 60/287 |
| 2013/0167512 | A1* | 7/2013 | Brueck | F01N 3/0871 60/282 |
| 2016/0051931 | A1* | 2/2016 | Ito | B01J 21/063 422/180 |
| 2017/0175605 | A1* | 6/2017 | Hagimoto | B01D 53/9418 |

* cited by examiner

METHOD FOR SELECTIVE CATALYTIC REDUCTION SYSTEM

CROSS-REFERENCE TO RELATED APPLICATION

This Application is a 35 USC § 371 US National Stage filing of International Application No. PCT/EP2017/082191 filed on Dec. 11, 2017 which claims priority under the Paris Convention to European Patent Application No. 16205950.5 filed Dec. 21, 2016.

FIELD

The present invention relates to selective catalytic reduction (SCR) systems for treating exhaust gasses. In particular, he present invention relates to methods for improving the efficiency and functionality of SCR systems.

BACKGROUND

Selective catalytic reduction (SCR) systems are known and are generally included in the exhaust systems of diesel engines in order to treat the exhaust gases of such engines. Such systems involve the introduction of a diesel exhaust fluid (DEF) into exhaust gas flowing in an exhaust passage of an engine. The DEF contains urea which undergoes a thermolysis and hydrolysis within the exhaust passage whereby ammonia is produced. The ammonia passes into a SCR catalyst where it reacts with the exhaust gas, wherein nitrogen oxides (NOx) present in the exhaust gas are converted to nitrogen and water before passing out of the exhaust into the atmosphere.

A number of SCR systems which dose DEF into the exhaust passage have been proposed. Such systems are sometimes referred to as "wet spray" systems and inject a spray of aqueous urea into the exhaust gas where it decomposes to form ammonia. An example of such a system is shown in US2008307967A1. US'967 discloses an arrangement in which DEF is hydrolysed in a supply passage which is outside of a main exhaust passage. Specifically, DEF is dosed onto a hydrolysis catalyst and hydrolysed to ammonia. The ammonia flows downstream to an inlet of a SCR catalyst where it acts to reduce NOx. Generally, a known control process followed by a SCR system such as the one disclosed in US'967 involves dosing the hydrolysis reactor with DEF when ammonia is required to reduce NOx.

Current DEF dosing systems are limited by the amounts of DEF that can be delivered without DEF deposits forming on the surfaces of the aftertreatment system. Such deposits severely reduces the efficiency of the SCR system. Hence, DEF dosage rates are typically kept well below the maximum theoretical dosage rates. However, given that engine-out NOx levels are increasing, due to increasing engine efficiency, there is a need for a higher NOx conversion, and by extension a need for higher dosage levels of DEF. However. $NH_3$ does not necessarily increase proportionally with increased dosage rates of DEF, in part due to the transient nature of ammonia production on a hydrolysis catalyst.

It is an object of the present disclosure to at least address some of the above problems.

SUMMARY

In a first aspect, there is provided a method for a selective catalytic reduction system, the system comprising a hydrolysis catalyst being dosed with Diesel Exhaust Fluid (DEF), the method comprising:

providing a numerical model of a surface of a hydrolysis catalyst;

evaluating the numerical model to derive a predicted concentration of ammonia generated by the hydrolysis catalyst; and using the predicted concentration to control dosage of DEF onto the hydrolysis catalyst.

In some examples, the numerical model comprises a multi-phase model that models characteristics of a plurality of states of matter for each of a plurality of substances.

In some examples, the step of evaluating comprises determining values for a plurality of state parameters associated with each of the plurality of states of matter for each of the plurality of substances.

The matter state parameters may be representative of at least one of: phase transitions; chemical reaction parameters for at least one of the states of matter; energy balance between a plurality of states of matter; or mass balance between a plurality of states of matter.

In some examples, the numerical model comprises a spatial model of a hydrolysis catalyst to be modelled, the hydrolysis catalyst being divided into a plurality of discrete spatial units, and wherein the step of evaluating comprises evaluating the characteristics of each of the plurality of states of matter for each of the plurality of substances in each of the discrete spatial units.

In a second aspect, there is provided a selective catalytic reduction system for treating exhaust gas in an exhaust passage, the system comprising:

a hydrolysis catalyst;

a DEF dosing unit configured to inject DEF onto the hydrolysis catalyst;

a controller configured to carry out a method as set out above; and a plurality of sensors in communication with the controller.

In some examples, the plurality of sensors comprises at least one of: a Nitrogen Oxide sensor; an inlet temperature sensor, an outlet temperature sensor; or an NOx sensor.

In a third aspect, there is provided a computer program product containing one or more sequences of machine-readable instructions for performing the method as set out above.

In a fourth aspect, there is provided an exhaust apparatus for an engine, the apparatus comprising the selective catalytic reduction system as set out above.

In a fifth aspect, there is provided an engine comprising the selective catalytic reduction system as set out above.

Further aspects, features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Before describing specific embodiments of the invention in detail, it is instructive to present an example environment in which embodiments of the present invention may be implemented.

Figure 1:
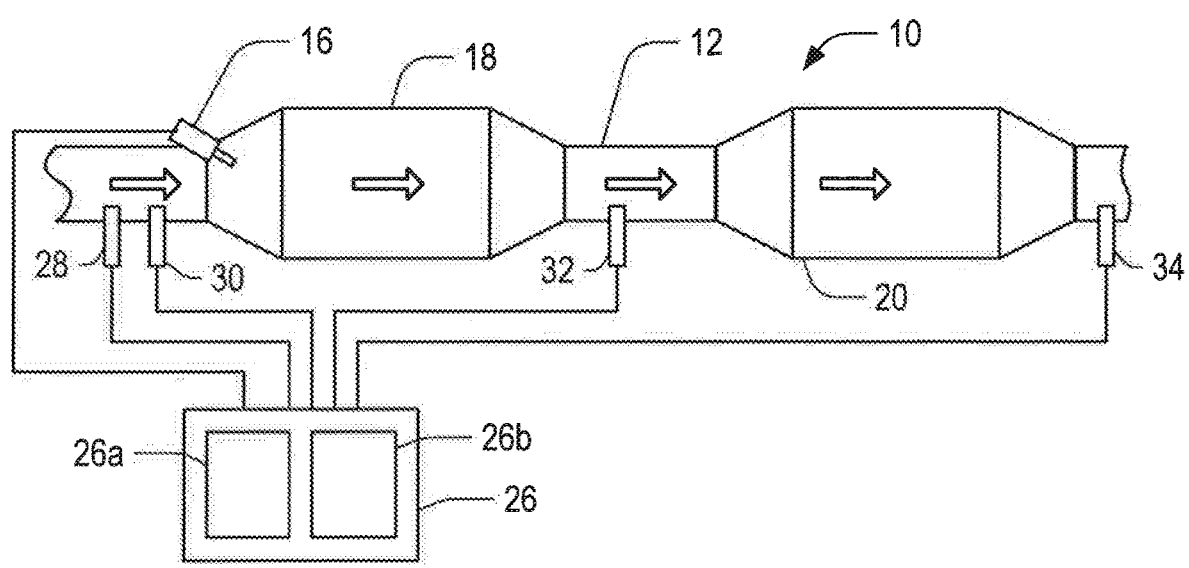
FIG. 1 shows a selective catalytic reduction system.

FIG. 1 shows an exemplary selective catalytic reduction (SCR) system 10. The system is located in an exhaust passage 12 that conveys exhaust gas away from an engine (not shown). Initially, the exhaust gas passes through a diesel oxidation catalyst (DOC, not shown) of a known type, which catalyses an oxidation reaction of hydrocarbons, nitric oxide and carbon monoxide in the exhaust gas to produce carbon dioxide, nitrogen dioxide and water.

Located downstream of the DOC is a diesel exhaust fluid (DEF) dosing unit 16 that is configured to inject DEF onto a hydrolysis catalyst 18. Both the DEF dosing unit and the hydrolysis catalyst are of known types. Located downstream of the hydrolysis catalyst is a SCR catalyst 20 of a known type. It will be appreciated that the system 10 may comprise additional components, such as an ammonia slip catalyst or a diesel particulate filter.

The system includes a controller 26 that is in communication with the DEF dosing unit, and is configured to control a rate at which the DEF dosing unit injects DEF onto the hydrolysis catalyst.

The system additionally includes a plurality of sensors in communication with the controller. Specifically, upstream of the hydrolysis catalyst is located a Nitrogen Oxide (NOx) sensor 28 and an inlet temperature sensor 30. Located between the hydrolysis catalyst and the SCR catalyst is an outlet temperature sensor 32 and a NOx sensor 34 located downstream of the SCR catalyst. It will be appreciated that the above-described sensors are exemplary only, and that additional or alternative sensors may be comprised in the system. Each of the various sensor may be connected to one or more inputs and/or outputs provided on the controller. During operation, the controller regulates the DEF dosage rate based, in part, on the measurement data received from the various sensors of the system.

It should be noted that, while the catalytic system is shown as having only a single controller 26, it is in principle equally possible to utilise a plurality of interconnected controllers. Alternatively, the controller may comprise a plurality of individual sub-controllers 26a, 26b. Each of the sub-controllers may perform specific operations, e.g. the first sub-controller 26a may perform operations relating to the performance of the SCR catalyst 20 and the second sub-controller 26b may perform operations relating to the performance of the hydrolysis catalyst 18.

As described previously, $NH_3$ production is difficult to predict using existing models. In order to overcome this, it is proposed to provide a numerical model that accurately models the behaviour of various compounds on the surface of a hydrolysis catalyst in order to predict the production of $NH_3$ for a given set of circumstances.

By integrating such a numerical model into the controller of a selective catalytic reduction (SCR) system, prediction of $NH_3$ production is enabled, thereby enabling the optimization of NOx conversion in the SCR system.

The numerical model may be implemented to take into account a number of parameters and/or a number of mechanisms. A number of exemplary parameters and mechanisms will be discussed in the following. It will be appreciated that these are purely for exemplary purposes and are not intended to be in any way limiting. It will also be appreciated that examples wherein additional or alternative parameters and mechanisms are taken into account may be envisaged by the skilled person, and that such examples fall within the scope of the present claims.

In reality, a plurality of specific chemical reactions may take place on the surface of the hydrolysis catalyst. In order to ensure accuracy of the numerical model, at least some of these reactions should be accounted for in the model. An exemplary list of chemical reactions that may occur on the surface of the hydrolysis catalyst is shown below. It will be realized that the below list of chemical reactions are exemplary only and non-limiting:

$$S+NH_3 \rightarrow (NH_3)_S$$

$$(NH_3)_S \rightarrow S+NH_3$$

$$S+HNCO \rightarrow (HNCO)_S$$

$$(HNCO)_S \rightarrow S+HNCO$$

$$S+H_2O \rightarrow (H_2O)_S$$

$$(H_2O)_S \rightarrow S+H_2O$$

$$(NH_2)_2CO \rightarrow HNCO+NH_3$$

$$(HNCO)_S+(H_2O)_S \rightarrow (NH_3)_S+CO_2$$

Each of the above-described chemical reactions may be evaluated by appropriate expressions provided in the numerical model. It will be appreciated that some of the chemical reactions may be linked or inter-dependent.

The numerical model may take into account matter state transitions, as well as related effect, between a plurality of states of matter. Chemical reactions in a catalytic system may involve a plurality of states of matter. As an example, DEF that is injected into the exhaust system (as described with reference to FIG. 1 above) is typically injected in liquid form onto the hydrolysis catalyst. On the surface of the hydrolysis catalyst, the DEF may either evaporate (i.e. transition into a gaseous state), form deposits (i.e. transition into a solid state) or accumulate in the form of a film.

Matter state transitions may have a direct effect on the operating conditions of the exhaust system. For example, when transitioning from a liquid to a gaseous state, a significant amount of energy will be consumed and a substance may increase its volume, which in turn may affect e.g the pressure or the temperature in the exhaust system.

The inventors have realized that, in order to ensure accuracy of the numerical model, it is necessary to model such matter state transitions and take into account effects relating thereto. In some examples, the numerical model comprises modelling mass balance of species in the catalytic system for at least some of the states of matter. In a preferred example, the mass balance of a plurality of species is modelled for three states of matter (i.e. solid, liquid and gas). Additionally or alternatively, the numerical model may comprise modelling energy balances of a plurality of substances in the catalytic system for at least some of the states of matter, and comprise a film momentum equation.

Figure 2:
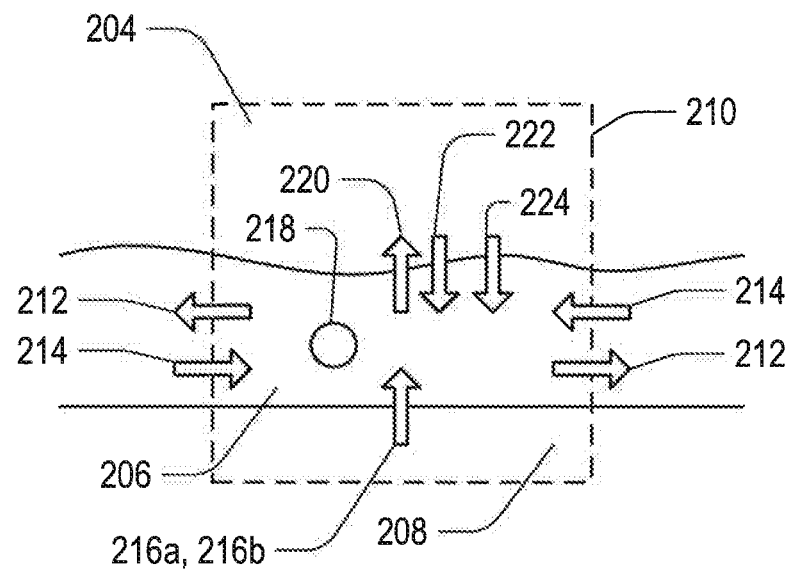
FIG. 2 depicts schematically an aspect of an exemplary numerical model.

FIG. 2 illustrates schematically an exemplary numerical model 200 of a surface of a hydrolysis catalyst. The numerical model comprises a multi-phase model that models characteristics of a plurality of matters states for each of a plurality of species. In the present example, the characteristics of three states of matter are modelled: gaseous 204, liquid 206 (e.g. DEF) and solid 208 (substrate wall, washcoat or deposit) states.

It will be appreciated that, while the Figure illustrates energy balance and energy transfer between the three states of matter, this is purely for purposes of illustration and not intended to be limiting.

The hydrolysis catalyst is, in the present example, divided into a number of discrete modelling units 210, each of which model a finite section of the hydrolysis catalyst. This allows for variation in the conditions along the length of the hydrolysis catalyst to be modelled and taken into account, thereby increasing the accuracy of the modelling results. It will be appreciated that, while the following is described with reference to a hydrolysis catalyst, it could in principle be applied to any suitable component of the aftertreatment system.

The energy balance in the film, wherein energy is transferred between the three states of matter can in one example be expressed as:

$$\frac{\partial(\delta_f T_f \rho C_{pf})}{\partial t} = q_{cond} + q_{conv} + q_{ext.conv} + q_{rxn} + (q_{hfcond} + q_{hfboil}) + q_{vzp} + q_{drop}$$

Additional energy balances in gas and solid phases (e.g. washcoat or deposit) may, in some examples, be advantageous or necessary. Additionally, it will be appreciated that, under certain operating conditions of the system, one or more specific terms in the above equation may become dominant, and one or more specific terms may become negligible. Under such circumstances, such negligible terms may be neglected or ignored in order to reduce the complexity of the calculation, and by extension increase the speed of the model. Similarly, specific parameters can be assumed to be at a pseudo steady-state to simplify the calculations and increase the speed of the model.

The individual heat fluxes of the above energy balance equation will now be described.

The term on the left hand side of the equation is the time dependent accumulation of energy in a discrete modelling unit of the film.

The first two terms on the right hand side of the energy balance in the film, $q_{conv}$ 212 and $q_{cond}$ 214 describe transfer of energy by convective flow and conduction between a particular discrete modelling unit within the film and one or more adjacent discrete modelling units within the film.

The fifth term on the right hand side of the equation describes heat flux between the solid and the film. Once the film's boiling point is reached, the heat flux changes from conduction ($q_{hfcond}$ 216a) to boiling ($q_{hfboil}$ 216b), and depends on the excess temperature.

$q_{rxn}$ 218 describes heat absorbed or released by reactions that may occur within the film. Typically, a majority of energy is adsorbed or released during solid phases (e.g. thermolysis and formation of urea deposit species in the deposit layer or hydrolysis or adsorption in the washcoat).

$q_{vap}$ 220 describes energy transfer as a result of vaporization of a compound in the liquid state into a gaseous state (i.e. water from the film).

$q_{drop}$ 222 describes transferred to the film by incoming DEF droplets impacting the film.

$q_{extconv}$ 224 describes energy transfer due to external convective heat transfer between the gas and liquid phase.

It will be appreciated that additional or alternative components may be included in the energy balance equation. It will further be appreciated that, while the above equation is used to determine energy balance in the film, it could in principle be used to model energy balances in the other phases, with corresponding mass balances in the various phases.

For clarity, FIG. 2 shows only a single discrete modelling unit. It will be appreciated, however, that in reality a plurality of discrete modelling units may be used to model at least a part of a surface in the system.

INDUSTRIAL APPLICABILITY

Figure 3:
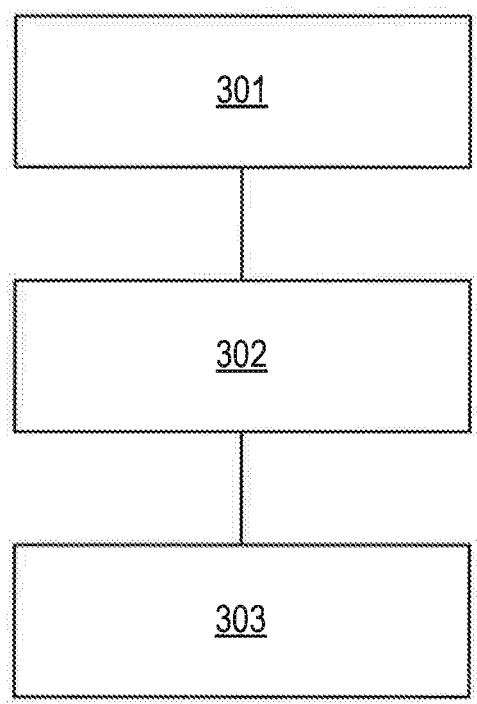
FIG. 3 illustrates an exemplary method for a selective catalytic reduction system.

An exemplary method will now be discussed with reference to FIG. 3, in which the above-described model may be used.

In a first step 301, a numerical model of a hydrolysis catalyst is provided. In an example, the numerical model is identical to the exemplary model described with reference to FIG. 2. In an example, the numerical model comprises a spatial model of a hydrolysis catalyst to be modelled, the hydrolysis catalyst being divided into a plurality of discrete spatial units, and comprises evaluating characteristics of each of the plurality of states of matter for each of the plurality of substances in each of the discrete spatial units. In other examples, the numerical model may comprise alternative or additional characteristics and parameters.

In a second step 302, the numerical model is evaluated to derive a predicted concentration of ammonia generated by the hydrolysis catalyst. The numerical model may be evaluated in any suitable fashion. In some examples, the step of evaluating comprises determining values for a plurality of matter state parameters associated with each of the plurality of states of matter for each of the plurality of substances. The matter state parameters may be representative of any of a plurality of suitable or relevant physical characteristics or effects. In an embodiment, the matter state parameters are representative of at least one of: state transitions between states of matter; chemical reaction parameters for at least one of the states of matter; energy balance between a plurality of states of matter; or mass balance between a plurality of states of matter.

In some examples, the numerical model is embedded into and evaluated by a suitable processing unit forming part of the SCR system. In other examples, the numerical model may be evaluated by a processing unit that is located remotely from the SCR system.

The numerical model may be evaluated in any suitable manner. In an example, the numerical model is implemented and evaluated by a processing unit forming part of an SCR system (such as the one shown in FIG. 1).

In a third step 303, the predicted concentration of ammonia is used to control dosage of DEF onto the hydrolysis catalyst. This step may be implemented in any suitable fashion.

The descriptions above are intended to be illustrative, not limiting. Thus, it will be apparent to one skilled in the art that modifications may be made to the invention as described without departing from the scope of the claims set out below.

The invention claimed is:

1. A method for a selective catalytic reduction (SCR) system, the system comprising a hydrolysis catalyst being dosed with Diesel Exhaust Fluid (DEF), the method comprising:

providing a numerical model of a surface of a hydrolysis catalyst, the numerical model comprising a multiphase model that models characteristics of a plurality of states of matter for each of a plurality of substances;

evaluating the numerical model to derive a predicted concentration of ammonia generated by the hydrolysis catalyst; and using the predicted concentration to control dosage of DEF onto the hydrolysis catalyst; wherein the step of evaluating comprises determining numerical values for a plurality of state parameters associated with each of the plurality of states of matter for each of the plurality of substances.

2. The method of claim 1, wherein the state parameters are representative of at least one of: phase transitions; chemical reaction parameters for at least one of the states of matter; energy balance between a plurality of states of matter, or mass balance between a plurality of states of matter.

3. The method of claim 1, wherein the numerical model comprises a spatial model of a hydrolysis catalyst to be modelled, the hydrolysis catalyst being divided into a plurality of discrete spatial units, and wherein the step of evaluating comprises evaluating the characteristics of each of the plurality of states of matter for each of the plurality of substances in each of the discrete spatial units.

4. A selective catalytic reduction system for treating exhaust gas in an exhaust passage, the system comprising:
    a hydrolysis catalyst;
    a DEF dosing unit configured to inject DEF onto the hydrolysis catalyst;
    a controller configured to carry out the method of claim 1; and
    a plurality of sensors in communication with the controller.

5. The selective catalytic reduction system of claim 4, wherein the plurality of sensors comprises at least one of: a hydrolysis catalyst inlet Nitrogen Oxide sensor; a hydrolysis catalyst inlet temperature sensor, a hydrolysis catalyst outlet temperature sensor; or a SCR catalyst outlet Nitrogen Oxide sensor.

6. A computer program product containing one or more sequences of engine-readable instructions for performing the method of claim 1.

7. An exhaust apparatus for an engine, the apparatus comprising the selective catalytic reduction system of claim 4.

8. An engine comprising the selective catalytic reduction system of claim 4.

9. The selective catalytic reduction system of claim 4, wherein the plurality of sensors comprises a hydrolysis catalyst inlet Nitrogen Oxide sensor, a hydrolysis catalyst inlet temperature sensor, a hydrolysis catalyst outlet temperature sensor; and a SCR catalyst outlet Nitrogen Oxide sensor.

10. A method for a selective catalytic reduction system, the system comprising a hydrolysis catalyst being dosed with Diesel Exhaust Fluid (DEF), the method comprising:
    providing a numerical model of a surface of a hydrolysis catalyst, the numerical model comprising:
        a multiphase model that models characteristics of a plurality of states of matter for each of a plurality of substances; and
        a spatial model of a hydrolysis catalyst to be modeled, the hydrolysis catalyst being divided into a plurality of discrete spatial unit;
    evaluating the numerical model to derive a predicted concentration of ammonia generated by the hydrolysis catalyst for each of the plurality of substances in each of the discrete spatial units; and
    using the predicted concentration to control dosage of DEF onto the hydrolysis catalyst.

* * * * *